United States Patent
Niesen et al.

(10) Patent No.: US 10,274,607 B2
(45) Date of Patent: Apr. 30, 2019

(54) FAST RECOVERY FROM INCORRECT CARRIER PHASE INTEGER LOCKING

(71) Applicant: QUALCOMM Incorporated, San Diego, CA (US)

(72) Inventors: Urs Niesen, Summit, NJ (US); Lionel Jacques Garin, Palo Alto, CA (US); Jubin Jose, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 15/264,460

(22) Filed: Sep. 13, 2016

(65) Prior Publication Data

US 2018/0074211 A1 Mar. 15, 2018

(51) Int. Cl.
G01S 19/44 (2010.01)
G01S 19/23 (2010.01)
G01S 19/42 (2010.01)

(52) U.S. Cl.
CPC ............. *G01S 19/44* (2013.01); *G01S 19/23* (2013.01); *G01S 19/426* (2013.01)

(58) Field of Classification Search
CPC ........ G01S 19/44; G01S 19/23; G01S 19/426; G01S 19/32; G01S 19/1943; G01S 19/36
USPC ..................................................... 342/357.27
See application file for complete search history.

(56) References Cited

U.S. PATENT DOCUMENTS

| | | | |
|---|---|---|---|
| 5,451,964 A | 9/1995 | Babu | |
| 5,991,691 A | 11/1999 | Johnson | |
| 6,735,523 B1 | 5/2004 | Lin et al. | |
| 8,686,900 B2 * | 4/2014 | Whitehead | A01B 69/008 342/357.27 |
| 2005/0114023 A1* | 5/2005 | Williamson | G01C 21/165 701/472 |
| 2006/0074558 A1* | 4/2006 | Williamson | G01C 21/165 701/469 |

(Continued)

FOREIGN PATENT DOCUMENTS

CN 105301618 A 2/2016

OTHER PUBLICATIONS

Chen, G., & Harigae, M. (Jun. 2001). Precise DGPS positioning and carrier phase ambiguity resolution using IMM Kalman filters. Proceedings of the International Symposium on Kinematic Systems in Geodesy, Geomatics and Navigation (KIS 2001), 339-347.

(Continued)

*Primary Examiner* — Harry K Liu
(74) *Attorney, Agent, or Firm* — Hunter Clark PLLC

(57) ABSTRACT

Determining a position of a device using a signal received from a reference emitter includes: receiving the signal; determining a state of a first filter, the state of the first filter including a first carrier phase ambiguity estimate that includes a floating value; determining a state of a second filter, the state of the second filter including a second carrier phase ambiguity estimate that includes a fixed value; determining whether the state of the second filter is consistent with one other filter state or measurement; maintaining the state of the second filter in response to the device determining that the state of the second filter is consistent with the other filter state; changing the state of the second filter to the state of the first filter in response to the device determining that the state of the second filter is not consistent with the other filter state.

14 Claims, 5 Drawing Sheets

(56) References Cited

U.S. PATENT DOCUMENTS

| | | | |
|---|---|---|---|
| 2007/0057839 A1 | 3/2007 | Kagawa et al. | |
| 2008/0297408 A1 | 12/2008 | Dai et al. | |
| 2009/0091493 A1* | 4/2009 | Hwang | G01S 19/07 342/357.44 |
| 2011/0115669 A1 | 5/2011 | Milyutin et al. | |
| 2012/0176271 A1* | 7/2012 | Dai | G01S 19/04 342/357.44 |
| 2012/0286991 A1* | 11/2012 | Chen | G01S 19/04 342/357.23 |
| 2013/0332072 A1* | 12/2013 | Janky | G01S 19/07 701/469 |
| 2015/0293233 A1* | 10/2015 | De Jong | G01S 19/04 342/357.27 |
| 2017/0299731 A1* | 10/2017 | Lie | G01S 19/42 |

OTHER PUBLICATIONS

International Search Report and Written Opinion—PCT/US2017/049592—ISA/EPO—dated Jan. 8, 2018.
Wei C., et al., "Performance Evaluation of GPS/Galileo Multiple-Frequency RTK Positioning Using a Single-difference Processor", GNSS 2008—21st International Technical Meeting of The Satellite Division of The Institute of Navigation (ION GNSS 2008), The Institute of Navigation, 8551 Rixlew Lane Suite 360 Manassas, VA 20109, USA, Sep. 19, 2008 (Sep. 19, 2008), 9 pages, XP056002853.

* cited by examiner

FAST RECOVERY FROM INCORRECT CARRIER PHASE INTEGER LOCKING

BACKGROUND

Satellite positioning systems (SPSs) broadcast positioning signals from a constellation of satellites that can be used by a device with an SPS receiver to determine the position and/or velocity of the device. Example SPS include Global Positioning System (GPS), Global Navigation Satellite System (GNSS), Galileo, GLONASS, Beidou (Compass), etc. In general, each satellite in an SPS broadcasts signals using at least one carrier frequency. The GPS system, for example, uses two carrier frequencies: 1575. 4 MHz and 1227.6 MHz. Other SPSs may use more than two carrier frequencies or just one carrier frequency.

Signals broadcast from an SPS satellite are conventionally modulated with a pseudo-random code (PRC). The PRC may also be referred to as a spreading code because it spreads the frequency spectrum of the signal over a particular range of frequencies (e.g., 1 MHz bandwidth). An SPS receiver receives the signal from the SPS satellite and determines a time of arrival (TOA) of the signal by correlating the received signal with a locally generated PRC. In this way, the distance between the SPS receiver and the satellite can be determined by, for example, determining the transit time of the signal (the difference in time between when the signal was received and when the satellite transmitted the signal) and multiplying that transit time by the speed of light. The distance between the satellite and the receiver is referred to as the pseudorange or a code phase measurement. Due to the limited bandwidth of the PRC (e.g., 1 MHz) and noise, the accuracy of the pseudorange measurement is on the order of one meter. However, if a carrier phase measurement is performed and used to determine the location of the receiver, the accuracy of the location of the receiver can be increased to on the order of one centimeter.

SUMMARY

An example of a method of determining a position of a device using a signal received from a reference emitter includes: receiving, with a receiver of the device, the signal from the reference emitter; determining a state of a first filter based on the signal, the state of the first filter including a first carrier phase ambiguity estimate that includes a floating value; determining a state of a second filter based on the signal, the state of the second filter including a second carrier phase ambiguity estimate that includes a fixed value; determining whether the state of the second filter is consistent with at least one other filter state or measurement; maintaining the state of the second filter in response to the device determining that the state of the second filter is consistent with the at least one other filter state or measurement; changing the state of the second filter to the state of the first filter in response to the device determining that the state of the second filter is not consistent with the at least one other filter state or measurement; and determining the position of the device based on the state of the second filter.

Implementations of such a method may include one or more of the following features. The at least one other filter state may be a previous state of the second filter. Determining whether the state of the second filter is consistent with the at least one other filter state or measurement may include determining whether an measurement prediction residual based on a current measurement is consistent with the previous state of the second filter. The at least one other filter state may be the state of the first filter. Determining whether the state of the second filter is consistent with the at least one other filter state or measurement may include determining whether an estimate from the state of the second filter is consistent with a variance of an estimate from the state of the first filter. The first filter may be a first Kalman filter and the second filter may be a second Kalman filter. The method may include fixing the second carrier phase ambiguity estimate by setting a covariance matrix term associated with the second carrier phase ambiguity estimate to be equal to or approximately equal to zero. The reference emitter may be a satellite.

An example of a device for determining a position of the device using a signal received from a reference emitter includes: a wireless receiver for wirelessly receiving the signal from the reference emitter; and a processor, communicatively coupled to the wireless receiver, configured to: determine a state of a first filter based on the signal, the state of the first filter including a first carrier phase ambiguity estimate that includes a floating value; determine a state of a second filter based on the signal, the state of the second filter including a second carrier phase ambiguity estimate that includes a fixed value; determine whether the state of the second filter is consistent with at least one other filter state or measurement; maintain the state of the second filter in response to the processor determining that the state of the second filter is consistent with the at least one other filter state or measurement; change the state of the second filter to the state of the first filter in response to the processor determining that the state of the second filter is not consistent with the at least one other filter state or measurement; and determine the position of the device based on the state of the second filter.

Implementations of such a device may include one or more of the following features. The at least one other filter state may be a previous state of the second filter. The processor may be configured to determine whether the state of the second filter is consistent with the at least one other filter state or measurement by determining whether an measurement prediction residual based on a current measurement is consistent with the previous state of the second filter. The at least one other filter state may be the state of the first filter. The processor may be configured to determine whether the state of the second filter is consistent with the at least one other filter state or measurement by determining whether an estimate from the state of the second filter is consistent with a variance of an estimate from the state of the first filter. The first filter may be a first Kalman filter and the second filter may be a second Kalman filter. The processor may be configured to fix the second carrier phase ambiguity estimate by setting a covariance matrix term associated with the second carrier phase ambiguity estimate to be equal to or approximately equal to zero.

An example of a device for determining a position of the device using a signal received from a reference emitter includes: receiving means for wirelessly receiving the signal from the reference emitter; first filtering means for determining a first state based on the signal, the first state including a first carrier phase ambiguity estimate that includes a floating value; second filtering means for determining a second state based on the signal, the second state including a second carrier phase ambiguity estimate that includes a fixed value; determining means for determining whether the second state is consistent with at least one other filter state or measurement; maintaining means for maintaining the second state in response to the device determining that the second state is consistent with the at least one other filter state or measurement; changing means for changing the second state to the first state in response to the device determining that the second state is not consistent with the at least one other filter state or measurement; and positioning means for determining the position of the device based on the second state.

Implementations of such a device may include one or more of the following features. The at least one other filter state may be a previous state of the second filtering means. The determining means may include means for determining whether a measurement prediction residual based on a current measurement is consistent with the previous state of the second filtering means. The at least one other filter state may be the first state. The determining means may include means for determining whether an estimate from the second state is consistent with a variance of an estimate from the first state. The first filtering means may include a first Kalman filter and the second filtering means may include a second Kalman filter. The second filtering means may include fixing means for setting a covariance matrix term associated with the second carrier phase ambiguity estimate to be equal to or approximately equal to zero.

An example of a non-transitory processor-readable storage medium includes processor-readable instructions configured to cause a processor of a device to: receive a signal from a reference emitter; determine a state of a first filter based on the signal, the state of the first filter including a first carrier phase ambiguity estimate that includes a floating value; determine a state of a second filter based on the signal, the state of the second filter including a second carrier phase ambiguity estimate that includes a fixed value; determine whether the state of the second filter is consistent with at least one other filter state or measurement; maintain the state of the second filter in response to the device determining that the state of the second filter is consistent with the at least one other filter state or measurement; change the state of the second filter to the state of the first filter in response to the device determining that the state of the second filter is not consistent with the at least one other filter state or measurement; and determine a position of the device based on the state of the second filter.

Implementations of such a device may include one or more of the following features. The at least one other filter state may be a previous state of the second filter. The instructions configured to cause the processor to determine whether the state of the second filter is consistent with the at least one other filter state may include instructions configured to cause the processor to determine whether an measurement prediction residual based on a current measurement is consistent with the previous state of the second filter. The at least one other filter state may be the state of the first filter. The instructions configured to cause the processor to determine whether the state of the second filter is consistent with the at least one other filter state or measurement may include instructions configured to cause the processor to determine whether the state of the second filter is consistent with a variance of an estimate from the state of the first filter. The first filter may be a first Kalman filter and the second filter may be a second Kalman filter. The non-transitory processor-readable storage medium may further include instructions configured to cause the processor of the device to fix the second carrier phase ambiguity estimate by setting a covariance matrix term associated with the second carrier phase ambiguity estimate to be equal to or approximately equal to zero. The reference emitter may be a satellite.

Items and/or techniques described herein may provide fast availability of precise positioning solutions without the risk of catastrophic filter failure. Information, such as location information, can be sent from a mobile device to a server even in situations where a condition would prevent the mobile device from sending the information at the scheduled time. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF THE DRAWINGS

Non-limiting and non-exhaustive examples of methods and systems are described with reference to the following figures. The figures may not be drawn to scale.

DETAILED DESCRIPTION

Figure 1:
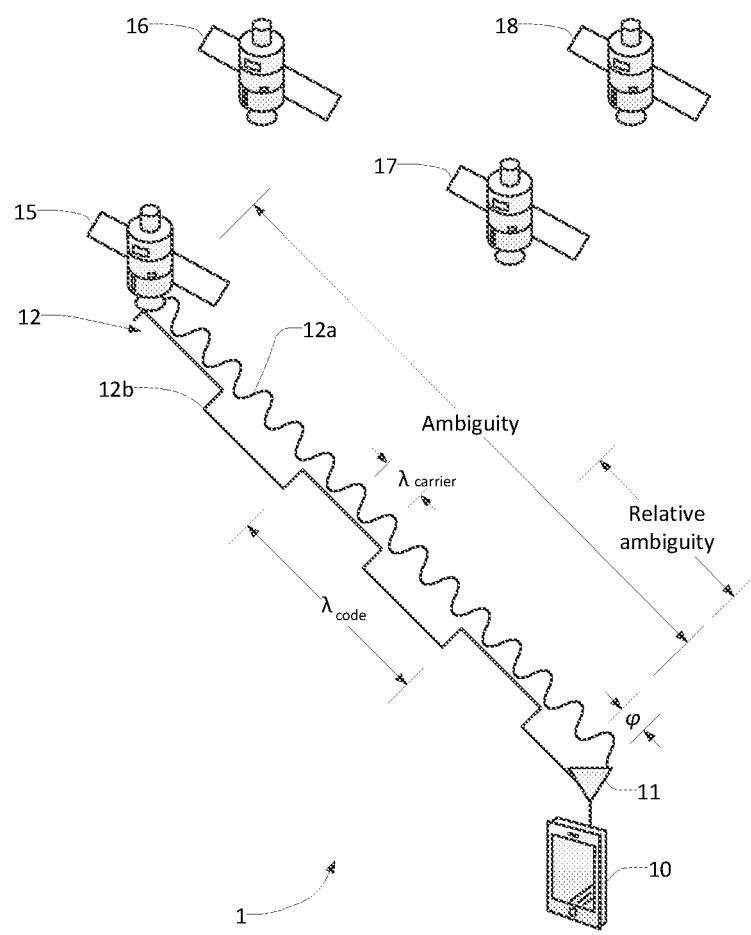
FIG. 1 is a simplified diagram of an example of a satellite positioning system.

Techniques are discussed herein for quickly recovering from incorrect carrier phase ambiguity fixes in a satellite positioning system (SPS). In general, SPS receivers provide two types of measurements: code phase measurements and carrier phase measurements. The code phase measurements typically have a noise standard deviation on the order of 1-2 meters. The carrier phase measurements, however, may be much more precise with a noise standard deviation on the order of 1-2 centimeters. The carrier phase measurements are generally only specified up to an initially unknown ambiguity term, which is equal to an integer value times the carrier wavelength. Accordingly, determining a precise position of an SPS receiver includes resolving of the ambiguity of the unknown integer value through an integer fixing process.

Typically, an integer fixing process is performed inside a Kalman filter. The filter may initially compute a float solution, which disregards the integer nature of the ambiguities. Once this float solution is close enough to an integer solution, the ambiguities in the filter are forced (or fixed) to this integer value and the corresponding entries in the filter covariance matrix are set to zero or some small value. This approach, however, is susceptible to catastrophic filter failure if receiver noise causes the ambiguities in the filter to be incorrectly fixed to the wrong integer value. To avoid such a failure, prior systems are extremely conservative in fixing the integer ambiguities. This conservative approach may avoid catastrophic filter failure, but it also typically results in long delays from the time the receiver is turned on until a precise solution with fixed ambiguities is available.

A fast integer ambiguity approach as described herein allows for fast fixing of the integer ambiguities and reduces the potential for a catastrophic filter failure. In an example, two Kalman filters are run in parallel. The first filter includes a state with floating carrier phase ambiguities and the second filter includes a state with fixed carrier phase ambiguities. In each new measurement epoch, the floating Kalman filter is updated with the measurements to produce the next float solution state and the fixed Kalman filter is updated with the measurements to produce the next fixed solution state. If the of the fixed solution state passes validation, it is incorporated in the fixed Kalman filter. The consistency of the fixed state may be verified by determining if the innovations of the fixed filter, or some other measurement prediction residual, are abnormal and/or determining if the fixed filter solution is diverging from the float filter solution. If the consistency of the fixed Kalman filter cannot be verified, then the fixed Kalman filter can be recovered by replacing the fixed state with the solution of the floating filter. In an example, the position may then be determined based on this recovered float solution.

Replacing the fixed filter with the floating filter allows the fixed filter to rapidly escape from a state with incorrectly fixed carrier phase ambiguities. As a result, the fast carrier-phase ambiguity approach described herein may be more aggressive in resolving the ambiguities. In particular, the validation of integer fixed integer solution may be less stringent. This may lead to faster availability of precise position solutions and reducing the risk of catastrophic filter failure.

Referring to FIG. 1, a simplified diagram of an example of a satellite positioning system (SPS) is shown. An SPS 1 includes a device 10 and a constellation of four satellites 15-18. The device 10 includes an antenna 11. Each of the satellites 15-18 emits a signal that is received by the antenna 11 and used by the device 10 to determine the position of the device based on the time of arrivals of the signals. For the sake of clarity, FIG. 1 illustrates only a single signal 12 emitted by satellite 15. However, while not shown in FIG. 1, the satellites 16-18 emit signals similar to the signal 12 and can be received by the device 10.

The signal 12, for purposes of illustrating the carrier phase ambiguity, is illustrated as two separate signals: a carrier signal 12a and a code signal 12b. The carrier signal 12a has a wavelength $\lambda_{carrier}$ and the code signal 12b has a wavelength $\lambda_{code}$, which is greater than $\lambda_{carrier}$. While not illustrated in detail in FIG. 1, the code signal 12b is a pseudo-random code (PRC) signal that repeats with a frequency that corresponds to the wavelength $\lambda_{code}$.

The device 10 includes an SPS receiver that is operably coupled to the antenna 11 and includes a carrier phase tracking loop for monitoring the carrier phase of the signal 12. Once the carrier phase tracking loop locks to the signal, an initial fractional carrier phase, $\varphi$, is determined. The device 10, however, cannot initially determine the total carrier phase of the signal 12 because the ambiguity of the carrier phase. That is, as depicted in FIG. 1, the total carrier phase is the sum of the integer number of wavelengths between the satellite 15 and the antenna 11 plus the fractional carrier phase, phase, $\varphi$. For example, the device 10 may determine the fractional carrier phase to be 0.7 times the carrier wavelength, $\lambda_{carrier}$, and the integer number of wavelengths between the satellite 15 and the antenna 11 may be 143 carrier phase wavelengths, making the total carrier phase difference equal to 143.7 times $\lambda_{carrier}$. The integer number of wavelengths between the satellite 15 and the antenna 11 is referred to as the carrier phase ambiguity.

Using the code signal 12b, the code phase of the signal 12 is determined by the device 10. There is no ambiguity in the code phase as the exact number of integer wavelengths, $\lambda_{code}$, can be determined by the mobile device 10. Consequently, an approximate value of the carrier phase ambiguity can be estimated based on the code phase measurement. This initial estimate is, for example, within about 50 wavelengths of the actual value of the carrier phase ambiguity. The carrier phase ambiguity can be determined as the actual number of wavelengths between the between the satellite 15 and the antenna 11, or as a relative number of wavelengths relative to the last integer code signal wavelength, referred to as the relative carrier phase ambiguity.

Conventional devices that receive SPS signals may estimate the carrier phase ambiguity using a single Kalman filter. The carrier phase ambiguity is one of several parameters of a state that is determined by the Kalman filter. Other state parameters may include an estimate of the three-dimensional position of the device, a clock bias estimate, and a clock drift estimate. The Kalman filter initially computes what is referred to as a "float solution," which disregards the integer nature of the carrier phase ambiguity. After a number of measurements are made, the float solution becomes close enough to an integer solution for the Kalman filter to fix the ambiguity value to an integer value, referred to as a "fixed solution." When the carrier phase ambiguity estimate in the Kalman filter is fixed, the other parameters of the Kalman filter state are recalculated. Subsequent estimates of the location of the device that are made with the Kalman filter having a fixed solution for the carrier phase ambiguity are more accurate than position estimates made using the floating solution.

Problems may arise in using the conventional technique when, due to noise, the Kalman filter fixes the carrier phase ambiguity to the wrong integer value. When this occurs, the filter becomes stuck in a "bad state" that produces incorrect location estimates. Once fixed, conventional techniques cannot escape this bad state and catastrophic filter failure occurs. When the Kalman filter fails in this way, the conventional approach is to reset the Kalman filter and start the measurement process again. This is a time consuming process that results in inaccurate positioning estimates for some period of time. The conventional approach is made more time consuming by attempting to avoid fixing the Kalman filter on an incorrect integer value for the carrier phase ambiguity by being conservative about when the floating solution is near enough to a particular integer to fix the carrier phase ambiguity and begin using a fixed solution. Waiting longer to use a fixed solution helps in avoiding an incorrect fixed solution for the carrier phase ambiguity, but results in long time delays from the time the Kalman filter is turned on until a precise positioning solution with fixed carrier phase ambiguity is available.

Techniques described herein allow the device 10 to fix the carrier phase ambiguity faster than conventional techniques by using a technique that allows for quick recovery from incorrect carrier phase ambiguity fixes in an SPS. Rather than using a single Kalman filter, the device 10 uses two Kalman filters operated in parallel. A first Kalman filter does not fix the carrier phase ambiguity, always maintaining a floating solution to the carrier phase ambiguity. This first Kalman filter is referred to as "a floating filter." A second Kalman filter initially operates with a floating solution of the carrier phase ambiguity, but fixes the carrier phase ambiguity to an integer value after a shorter period of time than conventional techniques allow. This second Kalman filter is referred to as "a fixed filter." The state of the second Kalman filter is used to determine the location of the device. By fixing the second Kalman filter sooner, the amount of time from starting positioning measurements to obtaining precise positioning solutions is reduced relative to techniques that wait a longer time to fix the carrier phase ambiguity. By fixing the carrier phase ambiguity earlier than conventional techniques, there is an increased risk of fixing on the incorrect integer value of the carrier phase ambiguity. However, instead of needing to restart the second Kalman filter, the incorrect carrier phase ambiguity fix can be corrected using the state of the first Kalman filter. In this way, the second Kalman filter can quickly recover from an incorrect fix.

Figure 2:
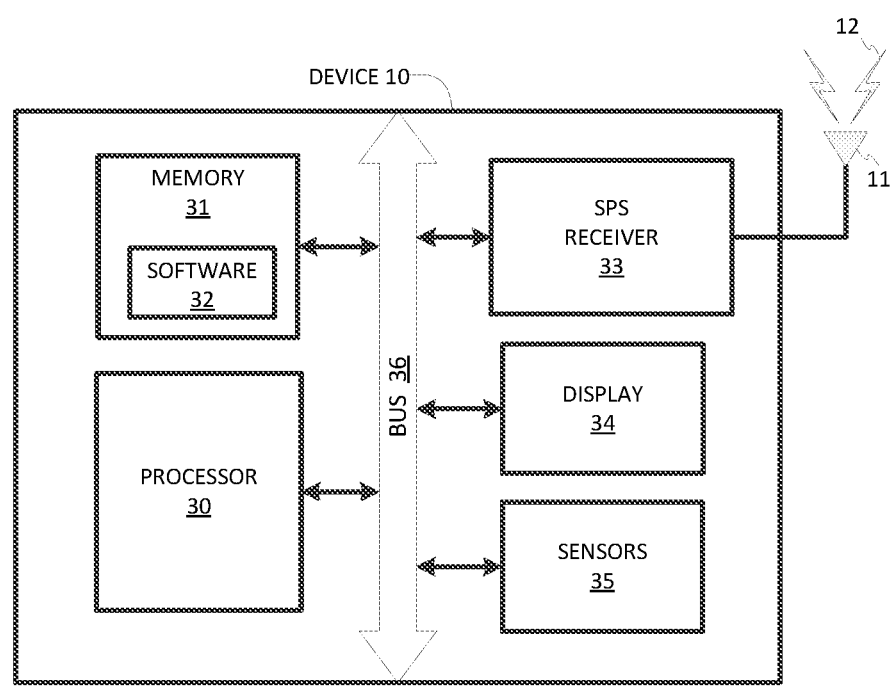
FIG. 2 is a block diagram of an example of a device that may be a part of the satellite positioning system of FIG. 1

Referring to FIG. 2, a block diagram of an example of a device 10 that may be a part of a satellite positioning system is shown. The device 10 is a computer system that includes the antenna 11, a processor 30, a memory 31, an SPS receiver 33, a display 34, and sensors 35. The device 10 may be a handheld mobile device, such as a mobile phone or smart phone, or a navigation device used by an individual or a vehicle, such as an automobile, boat, or airplane. In the cases where the device 10 is a mobile device, the device 10 includes one or more transceivers (not shown) for communicating with a cellular communication network by transmitting wireless signals to cellular base stations, such as wireless base transceiver stations (BTS), Node Bs, evolved NodeBs (eNB), etc. Similarly, device 10 may include other wireless transceivers (not shown) for transmitting wireless signals to and receiving wireless signals from local transceivers such as Wi-Fi access points (AP), femtocells, Home Base Stations, small cell base stations, Home Node Bs (HNB) or Home eNodeBs (HeNB) and may provide access to a wireless local area network (WLAN, e.g., IEEE 802.11 network), a wireless personal area network (WPAN, e.g., Bluetooth® network or ZigBee® network) or a cellular network (e.g. an LTE network or other wireless wide area network such as those discussed in the next paragraph).

The antenna 11 receives the wireless signal 12 from the satellite 15, as well as the signals emitted by the other satellites 16-18 in the SPS 1. The SPS receiver 33 is a wireless receiver for receiving the signal 12 from the satellite 15 via the antenna 11. The SPS receiver 33 includes the necessary systems (not shown) for measuring the code phase, carrier phase and Doppler shift of the signal 12, such as a delay lock loop and a phase lock loop. The SPS 1 may be a Global Positioning System (GPS), Global Navigation Satellite System (GNSS), Galileo, GLONASS, Beidou (Compass), etc. While examples of SPSs discussed herein are described as being based on satellite based systems, the satellites 15-18 are one example of a reference emitter that may emit a positioning signal. Other examples of reference emitters include space vehicles that are not in orbit, various aircraft, or ground based emitters, such as cellular network base stations.

The processor 30 is an intelligent device, e.g., a central processing unit (CPU) such as those made or designed by Qualcomm®, ARM®, Intel® Corporation, or AMD®, a microcontroller, an application specific integrated circuit (ASIC), etc. The memory 31 is non-transitory, processor-readable memory that stores instructions that may be executed by processor 30 and includes random access memory (RAM), read-only memory (ROM) and non-volatile memory such as flash memory or solid state storage. The display 34 may be a liquid-crystal display (LCD) (e.g., a thin-film transistor (TFT) display), although other forms of displays are acceptable. The display 34 displays location information to a user of the device by, for example, displaying coordinates and/or a graphical representation of the position of the device 10 on a map. Software 32 can be loaded onto the memory 31 by being downloaded via a network connection, uploaded from a disk, etc. Further, the software 32 may not be directly executable, e.g., requiring compiling before execution. The software 32 includes instructions configured to cause the processor 30 to perform functions described below. The various components of the mobile device 10 are communicatively coupled to one another via bus 36. While FIG. 2 illustrates the processor 30 and the memory 31 being separate from the SPS receiver 33, the processor 30 and memory 31 may be components of the SPS receiver 33 such that the processing of the SPS signal is performed by the SPS receiver.

The sensors 35 make measurements of the environment and/or conditions experienced by the device 10. The sensors 35 may include inertial sensors, such a gyroscopes and accelerometers, that may provide measurements of the position, orientation, velocity and acceleration of the device 10. The sensors 35 may also include a pressure sensor that may provide pressure measurements that can be used to determine elevation measurements. The output from the sensors 35 may be used to check the consistency of states of filters used by the device 10.

The processor 30 is communicatively coupled to the SPS receiver 33, the sensors 35, and the memory 31 via the bus 36. The processor 30 is configured to obtain the signal 12 from the SPS receiver 33 and determine the location of the device 10 from the signal 12 and the other signals received from the other satellites 16-18 of the SPS constellation. The processor 30 is also configured to obtain measurements from the sensor 35 and the SPS receiver 33 to determine the consistency of a state of the fixed filter of the device 10.

Figure 3:
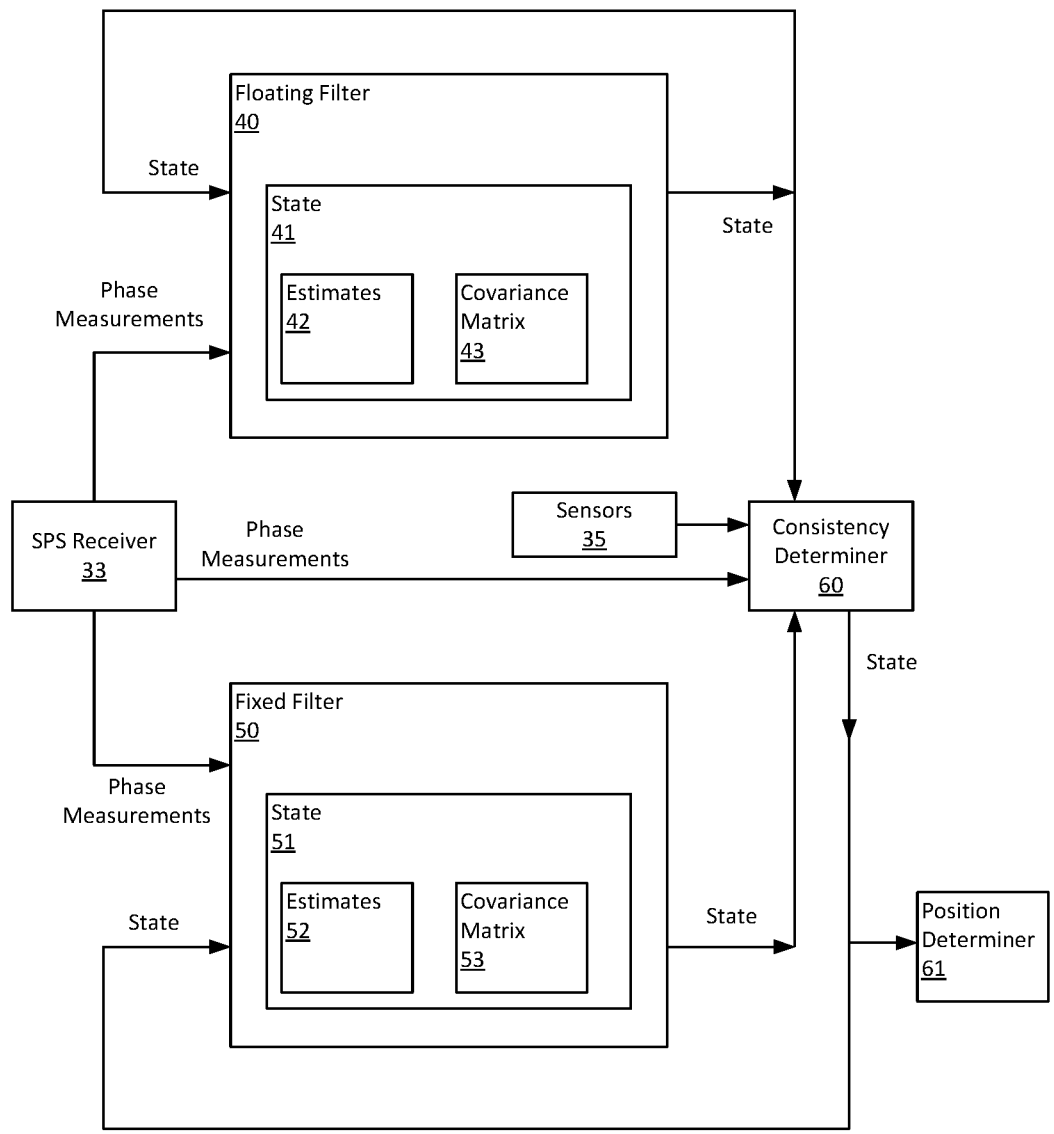
FIG. 3 is a functional block diagram of software executing on a processor of the device of FIG. 2.

Referring to FIG. 3, with further reference to FIG. 2, a functional block diagram of software executing on a processor is shown. The processor 30 is configured to determine a state of a first filter based on the signal 12. The SPS receiver 33 performs code phase and carrier phase measurements of the signal 12 and the measurement results are passed to the first filter, which is referred to as a floating filter 40 because the estimate of the carrier phase ambiguity determined by the first filter is a floating value that is not fixed to be an integer value. The floating filter 40 is a recursive filter that estimates a state 41 comprising multiple variables. The floating filter 40 may be a Kalman filter, an extended Kalman filter, a Bayes filter, or a particle filter. The state 41 of the floating filter 40 includes estimates 42 of the variables comprising the state and a covariance matrix 43 that relates the uncertainty of the multiple variables to one another. The variables that may be estimated by the floating filter 40 and included in the state 41 include: a three-dimensional position of the device (e.g., x, y, and z coordinates) and a clock bias, a clock drift, and a carrier phase ambiguity for each satellite from which signals are received.

The processor 30 is also configured to determine a state of a second filter based on the signal 12. The SPS receiver 33 sends the carrier phase and code phase measurement results to the second filter, which is referred to as a fixed filter 50 because the estimate of the carrier phase ambiguity determined by the first filter is a fixed value that is forced, by the processor 30, to be an integer value. The fixed filter 50 is a recursive filter that estimates a state 51 comprising multiple variables. The fixed filter 50 may be a Kalman filter, an extended Kalman filter, a Bayes filter, or a particle filter. The fixed filter 50 is the same type of filter as the floating filter 40. The state 51 of the fixed filter 50 includes estimates 52 of the variables comprising the state and a covariance matrix 53 that relates the uncertainty of the multiple variables to one another. The variables that may be estimated by the floating filter 40 and included in the state 41 include: a three-dimensional position of the device (e.g., x, y, and z coordinates), and a clock bias, a clock drift, and a carrier phase ambiguity for each satellite from which signals are received.

The state 41 of the floating filter 40 and the state 51 of the fixed filter 51 are updated when new signal are received, or every epoch of the SPS. The fixed filter 51 may not initially fix the carrier phase ambiguity to an integer value—it may be allowed to float for a period of time before being fixed. The processor 30 may be configured to fix the carrier phase ambiguity estimate of the state 51 by setting one or more terms of the covariance matrix 53 associated with the second carrier phase ambiguity to zero or approximately equal to zero. By setting these terms of the covariance matrix 53 the terms are fixed and not allowed to vary when the state 51 of the filter is updated. Setting a term of the covariance matrix 53 exactly equal to zero may cause the fixed filter 50 to give unreliable estimates for the other variables in the state 41 due to the covariance matrix becoming singular and uninvertible. These inversion issues may be avoided by setting the terms approximately equal to zero, rather than precisely equal to zero. The phrase approximately equal to zero, in this context, means a value that is small, but prevents the covariance matrix from being singular. Example values that would be considered approximately equal to zero are 1E-4 $m^2$ or 1E-6 $m^2$. However, these values are examples and implementations are not limited to these values.

The processor 30 is configured to implement a consistency determiner 60 for determining whether the state 51 of the fixed filter 50 is consistent with at least one other filter state or a measurement. To perform the consistency determination, the processor 30 receives both the state 41 from the floating filter 40 and the state 51 from the fixed filter 50. The at least one other state to which the consistency determiner 60 compares the state 51 from the fixed filter 50 may be the state 41 from the floating filter 40 and/or a previous state of the fixed filter 50. Previous states of each filter may be stored in memory 31 so that the state 51 of the fixed filter 50 can be compared to previous states of either filter. The consistency determiner 60 may also determine whether the state 51 of the fixed filter 50 is consistent with one or more measurements, such as the code phase measurements and/or carrier phase measurements from the SPC receiver 33 or measurements from sensors 35, which can include elevation measurements, orientation measurements, and acceleration measurements.

To determine whether the state 51 of the fixed filter 50 is consistent with a measurement, the consistency determiner 60 may determine whether a measurement prediction residual based on a current measurement is consistent with a variance of the measurement prediction residual from the previous filter state. The measurement prediction residual is a difference between the current measurement and a prediction of the current measurement based on the previous state of the fixed filter 50. In certain implementations, the measurement prediction residual may comprise an innovation or a whitened measurement determined from the fixed filter and the current measurement. The previous state of the fixed filter 50 is used to determine a prediction of the current state of the fixed filter, which is then used to predict the current measurement. The difference between the actual current measurement and the prediction of the current measurement is the measurement prediction residual. The measurement prediction residual can then be used to determine a prediction of the next state of the fixed filter 50. For example, the previous state of the fixed filter 50 may include a position and velocity estimate of the device. Based on the position and velocity from the previous state and a previous measurement prediction residual determination, the current state of the fixed filter 50 can be predicted. The variance of the measurement prediction residual can also be determined from the variances of the previous state of the fixed filter. If the measurement prediction residual is outside the variance determined based on the covariance matrix from the previous state, then the measurement is determined to be inconsistent with the previous state. To be considered outside the variance, the measurement prediction residual may be 1-2 standard deviations away from the measurement prediction residual predicted based on the previous state. Alternatively, a chi squared random variable may be used to determine if the measurement prediction residual is consistent with a statistical model based on the previous state of the fixed filter 50. In other words, the state 51 of the fixed filter is consistent with the previous state of the fixed filter 50 when the measurement prediction residual is within the noise expected based on the previous state of the fixed filter 50. For example, a 95% or 99% threshold value may be set such that if the consistency determiner 60 determines that the estimates 52 of the state 51 result in an measurement prediction residual that is less than 5% or 1% (respectively) likely to be described by the statistical model based on the previous state of the fixed filter 50, then the state 51 of the fixed filter is not consistent with the previous state of the fixed filter 50.

The aforementioned measurement may be received by the consistency determiner 60 from SPS Receiver 33 or sensors 35. The measurement may be a code phase measurement, a carrier phase measurement, a Doppler measurement, an elevation measurement, an orientation measurement, or an acceleration measurement.

To compare the state 51 of the fixed filter 50 to the state of the floating filter 40, the consistency determiner 60 may determine whether an estimate from the state 51 of the fixed filter 50 is consistent with a variance of an estimate from the state 41 of the floating filter 40. For example, if one or more of the estimates 52 of the state 51 is outside the variances found in the covariance matrix from the state 41 of the floating filter 40, then the measurement is determined to be inconsistent with the state 41 of the floating filter 41. To be considered outside the variances of the floating state 41, the one or more estimates 52 of the state 51 may be 1-2 standard deviations away from the estimate of the variable in the state 41 of the floating filter 40. Alternatively, a chi squared random variable may be used to determine if the estimates 52 are consistent with a statistical model based on the state 41 of the floating filter 40. In other words, the state 51 of the fixed filter is consistent with the state 41 of the floating filter 40 when the state 51 is within the noise expected based on the state 41 of the floating filter 40. For example, a 95% or 99% threshold value may be set such that if the consistency determiner 60 determines that the estimates 52 of the state 51 are less than 5% or 1% (respectively) likely to be described by the statistical model based on the state 41 of the floating filter 40, then the state 51 of the fixed filter is not consistent with the state 41 of the floating filter 40.

When the consistency determiner 60 determines that the state 51 of the fixed filter 50 is consistent with the at least one other filter state or the measurement, the fixed filter maintains the state of the fixed filter 50 until the next epoch when it will be updated based on new measurement information. On the other hand, when the consistency determiner 60 determines that the state 51 of the fixed filter 50 is not consistent with the at least one other filter state or the measurement, it is determined that the fixed filter 50 has fixed on an incorrect integer for the carrier phase ambiguity and the state of the fixed filter 50 is replaced by the state 41 of the floating filter 40. For example, both the estimates 42 and the covariance matrix 43 of the state 41 will be copied over the state determined for the fixed filter 50. The processor 30 may then fix the carrier phase ambiguity of the new copied state of the fixed filter 50. In this way, the fixed filter 50 does not need to be re-initialized, but can instead carry on execution based on the state of the floating filter 40. Thus, the state 41 of the floating filter 40 is not only used by the processor 30 to check the consistency of the state of the fixed filter 50, but it is also used to quickly recover from an incorrect carrier phase ambiguity fix.

The consistency determiner 60 may determine whether the state 51 of the fixed filter 50 is consistent with the at least one other filter state by comparing one estimate from the state 51 to a corresponding estimate and corresponding elements of the covariance matrix from the at least one other filter state, or by comparing multiple estimates from the state 51 to corresponding estimates and corresponding elements of the covariance matrix from the at least one other filter state, or by comparing all of the estimates from the state 51 to corresponding estimates and corresponding elements of the covariance matrix from the at least one other filter state. For example, the carrier phase ambiguity from state 51 can be compared to the carrier phase ambiguity (and the corresponding elements of the covariance matrix) of the previous state of 51 and/or the carrier phase ambiguity (and the corresponding elements of the covariance matrix) of the state 41.

After the state 51 of the fixed filter 50 is either maintained or changed to the state 41 of the floating filter 40, the position of the device 10 is determined based on the state of the fixed filter 50. As mentioned above, the three-dimensional coordinates of the device 10 are part of the estimates 52 of the fixed filter 50. Thus, the three-dimensional coordinates may be used as the position of the device 10, or further processing of the three-dimensional coordinates may be used to determine the position of the device in connection with other measurements, such as results of other positioning techniques.

Figure 4:
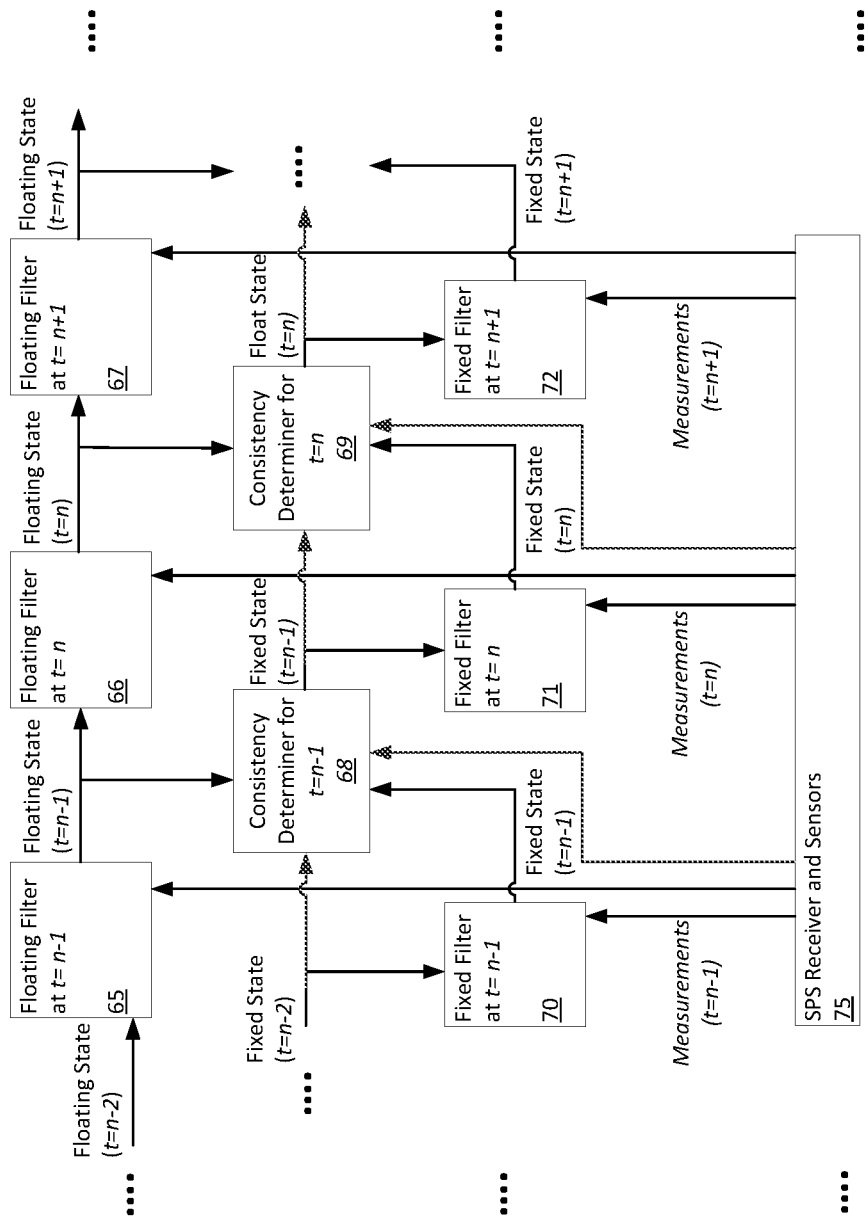
FIG. 4 is a functional block diagram of software executing on a processor of the device of FIG. 2.

Referring to FIG. 4, a functional block diagram of the software executing on a processor is shown. The operation of the software 32 of the device 10 over a period of three epochs of the SPS is described. The three epochs are labeled as time t=n-1, time t=n, and time t=n+1. The SPS receiver and sensors 75 transmit the phase measurements for time t=n-1 to the floating filter at time t=n-1 (65) and the fixed filter at time t=n-1 (70). The floating filter at time t=n-1 (65) also receives the floating state from time t=n-2, i.e., the previous state of the floating filter. The fixed filter at time t=n-1 (70) receives the fixed state from time t=n-2, i.e., the previous state of the fixed filter. Using this information the floating filter at time t=n-1 (65) determines the floating state at time t=n-1 and sends this state to a consistency determiner for the time t=n-1 (68), and the fixed filter at time t=n-1 (70) determines the fixed state at time t=n-1 and sends this state to a consistency determiner for the time t=n-1 (68).

The consistency determiner for the time t=n-1 (68) determines whether the state of the fixed filter at time t=n-1 is consistent with at least one other filter state or whether the state of the fixed filter at time t=n-2 is consistent with a measurement from time t=t-1 from the SPS receiver and sensors 75. In this example, the fixed state at time t=n-1 is compared to both the floating state from the time t=n-1 and the fixed state at time t=n-2 is compared to the measurement at time t=n-1. The consistency determiner for the time t=n-1 (68) determines that the fixed state from time t=n-1 is consistent with the state of the floating filter at time t=n-1 and determines that the fixed state from time t=n-2 is consistent with the measurements from time t=n-1, and sends the fixed state from t=n-1 to the fixed filter at t=n. For the same of clarity, the position determiner is not shown in FIG. 4. The position determination for the time t=n-1 is performed using the fixed state at time t=n-1.

Then, the process repeats for the next epoch at time t=n. The SPS receiver 33 transmits the phase measurements for the time t=n to the floating filter at time t=n (66) and the fixed filter at time t=n (71). The floating filter at time t=n (66) also receives the floating state from time t=n-1, i.e., the previous state of the floating filter. The fixed filter at time t=n (71) receives the fixed state from time t=n-1, i.e., the previous state of the fixed filter. Using this information the floating filter at time t=n (66) determines the floating state at time t=n and sends this state to a consistency determiner for the time t=n (69), and the fixed filter at time t=n (71) determines the fixed state at time t=n and sends this state to a consistency determiner for the time t=n (69).

The consistency determiner for the time t=n (69) determines whether the state of the fixed filter at time t=n is consistent with the floating state from the time t=n and whether the fixed state from time t=n-1 is consistent with the measurement from the SPS receiver and sensor 75 at time t=n. The consistency determiner for the time t=n (69) determines that the fixed state from time t=n is not consistent with the state of the floating filter at time t=n and/or the fixed state from time t=n-1 is not consistent with the measurements from time t=n. As a result, the consistency determiner 69 sends the floating state from t=n to the fixed filter at t=n+1. For the same of clarity, the position determiner is not shown in FIG. 4. The position determination for the time t=n is performed using the floating state at time t=n because the state of the fixed filter was determined to be inconsistent.

Thus, as described above, FIG. 4 shows the state of the fixed filter being maintained when the state of the fixed state is consistent, and the state of the fixed filter being replaced by the floating state when the fixed state is determined to be inconsistent. While FIG. 4 illustrates multiple versions of the floating filter, the fixed filter and the consistency determiner, this was done to show how the functional blocks of the software 32 may pass information from one block to another over time.

Figure 5:
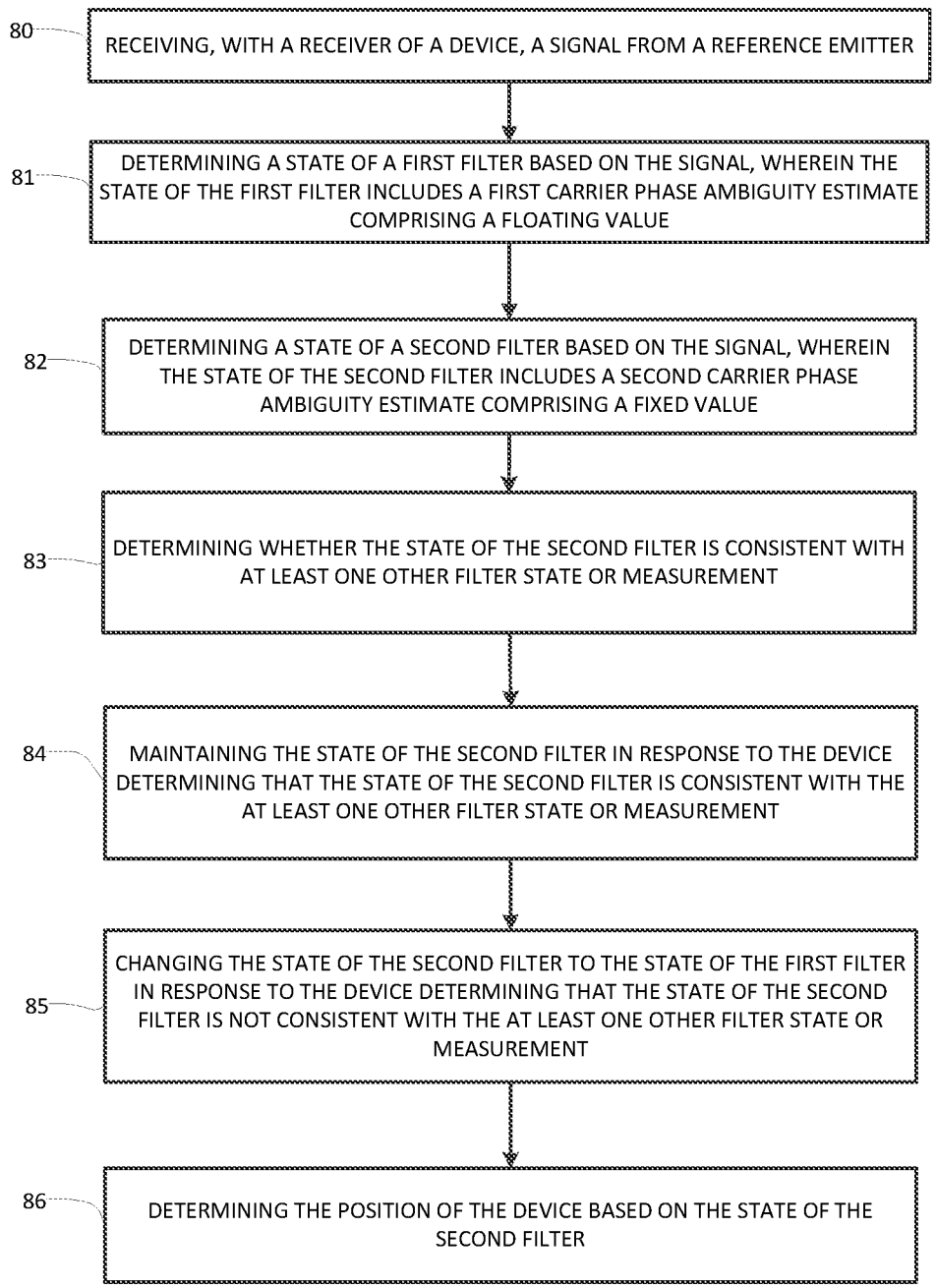
FIG. 5 is a flow diagram of an example method of determining the location of the device of FIG. 2.

Referring to FIG. 5, with further reference to FIGS. 1-4, a method 5 of determining a position of a device 10 using a signal 12 received from a reference emitter includes the stages shown. The method 5 is, however, an example only and not limiting. The method 5 can be altered, e.g., by having stages added, removed, rearranged, combined, performed concurrently, and/or having single stages split into multiple stages.

At stage 80, the method 5 includes receiving, with a receiver of the device 10, the signal from the reference emitter. The receiver may be a SPS receiver 33 that receives signals (including the signal 12) from the satellites 15-18 of an SPS 1. The receiver may receive the signal from an antenna of the device 10, which converts the wireless signal sent by the satellite 15 to an electrical signal that can be processed by processor 30. The receiver may also perform measurements on the received signals. For example, code phase and carrier phase measurements may be made. Alternatively, the code phase and carrier phase measurements may be made by a processor that is communicatively coupled to the receiver.

At stage 81, the method 5 includes determining a state of a first filter based on the signal, wherein the state of the first filter includes a first carrier phase ambiguity estimate comprising a floating value. The stage 81 may be performed using the processor 30 and the memory 31. The first filter may be a recursive filter, such as a Kalman filter, an extended Kalman filter, a Bayes filter, or a particle filter. As inputs, the first filter uses a previous state of the first filter and carrier phase measurements and code phase measurements of the signal. The state of the first filter includes a set of estimates and a covariance matrix. The variables that may be estimated by the first filter and included in the state of the first filter include: a three-dimensional position of the device (e.g., x, y, and z coordinates) and a clock bias, a clock drift, and a carrier phase ambiguity for each satellite from which signals are received. As mentioned above, the first carrier phase ambiguity estimate is not fixed, but is instead allowed to float. In this way, even though it is known a priori that the first carrier phase ambiguity is an integer value, the first carrier phase ambiguity estimate from the state of the first filter is not fixed to be an integer value.

At act 82, the method 5 includes determining a state of a second filter based on the signal, wherein the state of the second filter includes a second carrier phase ambiguity estimate comprising a fixed value. The stage 82 may be performed using the processor 30 and the memory 31. The second filter may also be a recursive filter, such as a Kalman filter, an extended Kalman filter, a Bayes filter, or a particle filter. The second filter may be of the same type as the first filter. As inputs, the second filter uses a previous state of the second filter and carrier phase measurements and code phase measurements of the signal. The state of the second filter includes a set of estimates and a covariance matrix. The variables that may be estimated by the second filter and included in the state of the second filter include: a three-dimensional position of the device (e.g., x, y, and z coordinates) and a clock bias, a clock drift, and a carrier phase ambiguity for each satellite from which signals are received. As mentioned above, the second carrier phase ambiguity estimate is fixed, such that is not allowed to float. In this way, the carrier phase ambiguity estimate from the state of the first filter is set to be an integer value. The carrier phase ambiguity estimate of the state of the second filter may be fixed by setting one or more terms of the covariance matrix associated with the second carrier phase ambiguity to zero or approximately equal to zero. By setting these terms of the covariance matrix the terms are fixed and not allowed to vary when the state 51 of the filter is updated. Setting a term of the covariance matrix exactly equal to zero may cause the second filter to give unreliable estimates for the other variables in the state 41 due to the covariance matrix becoming singular and uninvertible. These inversion issues may be avoided by setting the terms approximately equal to zero, rather than precisely equal to zero. The phrase approximately equal to zero, in this context, means a value that is small, but prevents the covariance matrix from being singular. Example values that would be considered approximately equal to zero are $0.01^2$ m$^2$ or $0.001^2$ m$^2$. However, these values are examples and implementations are not limited to these values.

At act 83, the method 5 includes determining whether the state of the second filter is consistent with at least one other filter state. The stage 81 may be performed using the processor 30 and the memory 31. The at least one other filter state to which the state of the second filter is compared may be the state of the first filter and/or a previous state of the second filter.

To determine whether the previous state of the second filter is consistent with a current measurement, the processor 30 may determine whether a measurement prediction residual of the second filter is consistent with a variance of the measurement prediction residual, which can be determined from the variances of the previous state of the fixed filter. If the measurement prediction residual is outside the variance determined based on the covariance matrix from the previous state, then the measurement is determined to be inconsistent with the previous state. To be considered outside the variance, the measurement prediction residual may be 1-2 standard deviations away from the measurement prediction residual predicted based on the previous state. Alternatively, a chi squared random variable may be used to determine if the measurement prediction residual is consistent with a statistical model based on the previous state of the second filter. In other words, the state of the second filter is consistent with the previous state of the second filter when the measurement prediction residual is within the noise expected based on the previous state of the second filter. For example, a 95% or 99% threshold value may be set such that if the estimates of the state of the second filter result in an measurement prediction residual that is less than 5% or 1% (respectively) likely to be described by the statistical model based on the previous state of the second filter, then the state of the second filter is not consistent with the previous state of the second filter.

To determine whether the state of the second filter is consistent with the state of the first filter, the processor 30 may determine whether an estimate from the state of the second filter is consistent with a variance of an estimate from the state of the first filter. For example, if one or more of the estimates of the state of the second filter is outside the variances found in the covariance matrix from the state of the first filter, then the measurement is determined to be inconsistent with the state of the first filter. To be considered outside the variances of the state of the first filter, the one or more estimates of the state of the second filter may be 1-2 standard deviations away from the estimate of the variable in the state of the first filter. Alternatively, a chi squared random variable may be used to determine if the estimates are consistent with a statistical model based on the state of the first filter. In other words, the state of the second filter is consistent with the state of the first filter when the state is within the noise expected based on the state of the first filter. For example, a 95% or 99% threshold value may be set such that if the estimates from the state of the second filter are less than 5% or 1% (respectively) likely to be described by the statistical model based on the state of the first filter, then the state of the second filter is not consistent with the state of the first filter.

At act 84, the method 5 includes maintaining the state of the second filter in response to the device determining that the state of the second filter is consistent with the at least one other filter state. The stage 84 may be performed using the processor 30 and the memory 31. The phrase "maintaining the state of the second filter" means keeping the determined state of the second filter as determined by the processor 30 without changing the state of the second filter based on the state of the first filter.

At act 85, the method 5 includes changing the state of the second filter to the state of the first filter in response to the device determining that the state of the second filter is not consistent with the at least one other filter state. The stage 85 may be performed using the processor 30 and the memory 31. Changing the state of the second filter may include overwriting the state of the second filter, which may be stored in memory 31, with the state of the first filter. When the state of the second filter is not consistent with the at least one other filter state, it is determined that the second filter fixed on an incorrect integer for the carrier phase ambiguity and the state of the second filter is replaced by the state of the first filter. For example, both the estimates and the covariance matrix of the state of the first filter may be copied over the state determined by the second filter. After replacing the state of the second filter with the state of the first filter, the carrier phase ambiguity of the new copied state of the second filter may be fixed, as described above.

Determining whether the state of the second filter is consistent with the at least one other filter state may include comparing one estimate from the state of the second filter with a corresponding estimate and corresponding elements of the covariance matrix from the at least one other filter state, or by comparing multiple estimates from the state of the second filter to corresponding estimates and corresponding elements of the covariance matrix from the at least one other filter state, or by comparing all of the estimates from the state of the second filter to corresponding estimates and corresponding elements of the covariance matrix from the at least one other filter state. For example, the carrier phase ambiguity from state of the second filter can be compared to the carrier phase ambiguity (and the corresponding elements of the covariance matrix) of the previous state of the second filter and/or the carrier phase ambiguity (and the corresponding elements of the covariance matrix) of the state of the first filter.

At stage 86, the method 5 includes determining the position of the device based on the state of the second filter. The three-dimensional coordinates of the device 10 are part of the estimates of the second filter. Thus, the three-dimensional coordinates may be used as the position of the device 10, or further processing of the three-dimensional coordinates may be used to determine the position of the device in connection with other measurements, such as results of other positioning techniques.

Other Considerations

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Further, more than one invention may be disclosed.

A wireless network is a communication system in which communications are conveyed wirelessly, i.e., by electromagnetic and/or acoustic waves propagating through atmospheric space rather than through a wire or other physical connection. A wireless network may not have all communications transmitted wirelessly, but is configured to have at least some communications transmitted wirelessly.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions.

The processes, systems, and devices discussed above are examples. Various configurations may omit, substitute, or add various procedures or components as appropriate. For instance, in alternative configurations, the processes may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

What is claimed is:

1. A method of determining a position of a device using a signal received from a reference emitter, the method comprising:

receiving, with a receiver of the device, the signal from the reference emitter;

determining a state of a first filter of the receiver based on the signal, wherein the state of the first filter includes a first carrier phase ambiguity estimate comprising a floating value;

determining a state of a second filter of the receiver based on the signal, wherein the state of the second filter includes a second carrier phase ambiguity estimate comprising a fixed value;

determining whether the state of the second filter is consistent with at least one of the state of the first filter and a previous state of the second filter, wherein determining whether the state of the second filter is consistent with the state of the first filter comprises determining whether an estimate from the state of the second filter is consistent with a variance of an estimate from the state of the first filter, and wherein determining whether the state of the second filter is consistent with the previous state of the second filter comprises determining whether a measurement prediction residual based on a current measurement is consistent with a measurement prediction residual determined in the previous state of the second filter;

maintaining the state of the second filter in response to the device determining that the state of the second filter is consistent with the at least one of the state of the first filter and the previous state of the second filter;

changing the state of the second filter to the state of the first filter in response to the device determining that the state of the second filter is not consistent with the at least one of the state of the first filter and the previous state of the second filter; and determining the position of the device based on the state of the second filter.

2. The method of claim 1, wherein the first filter is a first Kalman filter and the second filter is a second Kalman filter.

3. The method of claim 1, further comprising fixing the second carrier phase ambiguity estimate by setting a covariance matrix term associated with the second carrier phase ambiguity estimate to be equal to or approximately equal to zero.

4. The method of claim 1, wherein the reference emitter is a satellite.

5. A device for determining a position of the device using a signal received from a reference emitter, the device comprising:

a wireless receiver for wirelessly receiving the signal from the reference emitter; and a processor, communicatively coupled to the wireless receiver, configured to:

determine a state of a first filter based on the signal, wherein the state of the first filter includes a first carrier phase ambiguity estimate comprising a floating value;

determine a state of a second filter based on the signal, wherein the state of the second filter includes a second carrier phase ambiguity estimate comprising a fixed value;

determine whether the state of the second filter is consistent with at least one of the state of the first filter and a previous state of the second filter, wherein determining whether the state of the second filter is consistent with the state of the first filter comprises determining whether an estimate from the state of the second filter is consistent with a variance of an estimate from the state of the first filter, and wherein determining whether the state of the second filter is consistent with the previous state of the second filter comprises determining whether a measurement prediction residual based on a current measurement is consistent with a measurement prediction residual determined in the previous state of the second filter;

maintain the state of the second filter in response to the processor determining that the state of the second filter is consistent with the at least one of the state of the first filter and the previous state of the second filter;

change the state of the second filter to the state of the first filter in response to the processor determining that the state of the second filter is not consistent with the at least one of the state of the first filter and the previous state of the second filter; and determine the position of the device based on the state of the second filter.

6. The device of claim 5, wherein the first filter is a first Kalman filter and the second filter is a second Kalman filter.

7. The device of claim 5, wherein the processor is configured to fix the second carrier phase ambiguity estimate by setting a covariance matrix term associated with the second carrier phase ambiguity estimate to be equal to or approximately equal to zero.

8. A device for determining a position of the device using a signal received from a reference emitter, the device comprising:
receiving means for wirelessly receiving the signal from the reference emitter;
first filtering means for determining a first state based on the signal, wherein the first state includes a first carrier phase ambiguity estimate comprising a floating value;
second filtering means for determining a second state based on the signal, wherein the second state includes a second carrier phase ambiguity estimate comprising a fixed value;
determining means for determining whether the second state is consistent with at least one of the first state of the first filtering means and a previous state of the second filtering means, wherein the determining means comprises means for wherein determining whether the second state of the second filtering means is consistent with the first state of the first filtering means comprises determining whether an estimate from the state of the second filter is consistent with a variance of an estimate from the state of the first filter, and wherein the determining means comprises means for determining whether a measurement prediction residual based on a current measurement is consistent with a measurement prediction residual determined in the previous state of the second filtering means;
maintaining means for maintaining the second state in response to the device determining that the second state is consistent with the at least one of the first state of the first filtering means and the previous state of the second filtering means;
changing means for changing the second state to the first state in response to the device determining that the second state is not consistent with the at least one of the first state of the first filtering means and the previous state of the second filtering means; and
positioning means for determining the position of the device based on the second state.

9. The device of claim 8, wherein the first filtering means comprises a first Kalman filter and the second filtering means comprises a second Kalman filter.

10. The device of claim 8, wherein the second filtering means comprises fixing means for setting a covariance matrix term associated with the second carrier phase ambiguity estimate to be equal to or approximately equal to zero.

11. A non-transitory processor-readable storage medium comprising processor-readable instructions configured to cause a processor of a device to:
receive a signal from a reference emitter;
determine a state of a first filter based on the signal, wherein the state of the first filter includes a first carrier phase ambiguity estimate comprising a floating value;
determine a state of a second filter based on the signal, wherein the state of the second filter includes a second carrier phase ambiguity estimate comprising a fixed value;
determine whether the state of the second filter is consistent with at least one of the state of the first filter and a previous state of the second filter, wherein the instructions configured to cause the processor to determine whether the state of the second filter is consistent with the state of the first filter comprise instructions configured to cause the processor to determine whether an estimate from the state of the second filter is consistent with a variance of an estimate from the state of the first filter, and wherein the instructions configured to cause the processor to determine whether the state of the second filter is consistent with the previous state of the second filter comprise instructions configured to cause the processor to determine whether a measurement prediction residual based on a current measurement is consistent with a measurement prediction residual determined in the previous state of the second filter;
maintain the state of the second filter in response to the device determining that the state of the second filter is consistent with the at least one;
change the state of the second filter to the state of the first filter in response to the device determining that the state of the second filter is not consistent with the at least one or the measurement; and
determine a position of the device based on the state of the second filter.

12. The non-transitory processor-readable storage medium of claim 11, wherein the first filter is a first Kalman filter and the second filter is a second Kalman filter.

13. The non-transitory processor-readable storage medium of claim 11, further comprising instructions configured to cause the processor of the device to fix the second carrier phase ambiguity estimate by setting a covariance matrix term associated with the second carrier phase ambiguity estimate to be equal to or approximately equal to zero.

14. The non-transitory processor-readable storage medium of claim 11, wherein the reference emitter is a satellite.

* * * * *